United States Patent [19]

Liang

[11] Patent Number: 5,030,060

[45] Date of Patent: Jul. 9, 1991

[54] METHOD AND APPARATUS FOR COOLING HIGH TEMPERATURE CERAMIC TURBINE BLADE PORTIONS

[75] Inventor: George P. Liang, Palm City, Fla.

[73] Assignee: The United States of America as represented by The Secretary of The Air Force, Washington, D.C.

[21] Appl. No.: 262,766

[22] Filed: Oct. 20, 1988

[51] Int. Cl.$^5$ .................................................. F01D 5/00
[52] U.S. Cl. ........................................ 415/115; 416/95
[58] Field of Search ............... 415/175, 116, 117, 115; 416/97 R, 241 B, 95, 96 A, 96 R, 1

[56] References Cited

U.S. PATENT DOCUMENTS

| | | | |
|---|---|---|---|
| 2,931,623 | 4/1960 | Hyde | 416/97 R |
| 3,010,696 | 11/1961 | Everett | 416/97 R |
| 3,057,597 | 10/1962 | Meyer et al. | 416/97 R |
| 3,164,367 | 1/1965 | Lynch | 416/97 R |
| 3,172,621 | 3/1965 | Erwin | 244/44 |
| 3,623,825 | 11/1971 | Schneider | 416/97 R |
| 3,736,071 | 5/1973 | Kydd | 416/97 R |
| 3,799,696 | 3/1974 | Redman | 416/97 R |
| 3,804,551 | 4/1974 | Moore | 416/97 R |
| 3,806,276 | 4/1974 | Aspinwall | 416/97 R |
| 3,807,892 | 4/1974 | Frei et al. | 416/97 R |
| 4,017,210 | 4/1977 | Darrow | 416/97 R |
| 4,042,162 | 8/1977 | McGinnis et al. | 416/96 A |
| 4,249,291 | 2/1981 | Grondahl et al. | 29/156.8 H |
| 4,314,794 | 2/1982 | Holden et al. | 416/241 B |
| 4,376,004 | 3/1983 | Bratton et al. | 416/241 B |
| 4,384,823 | 5/1983 | Graham et al. | 416/1 |
| 4,531,889 | 7/1985 | Grondahl | 416/97 R |
| 4,684,322 | 8/1987 | Clifford et al. | 416/95 |
| 4,786,234 | 11/1988 | Readnour | 416/97 R |
| 4,790,721 | 12/1988 | Morris et al. | 416/96 A |

Primary Examiner—Edward K. Look
Assistant Examiner—Hoang Nguyen
Attorney, Agent, or Firm—Jacob N. Erlich; Donald J. Singer

[57] ABSTRACT

An array of skewed cooling air conduits are embedded within a ceramic turbine blade for cooling an upper blade surface by producing a cool air film thereon, and by removing heat through conduction. The conduits provide a large bonding surface area in the ceramic, and are recessed to prevent clogging by the ceramic and to prevent direct contact with the hot gas stream at the upper blade surface.

8 Claims, 2 Drawing Sheets

METHOD AND APPARATUS FOR COOLING HIGH TEMPERATURE CERAMIC TURBINE BLADE PORTIONS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of aircraft turbine blades and more particularly the cooling of ceramic blades.

Ceramic blade outer airseal life is a perennial problem in the first stage of high temperature turbines. Typical ceramic airseal failure is characterized by either cracking or partial spalling, resulting in an increased turbine tip clearance which produces a high leakage flow, reducing turbine efficiency. Such failure can be alleviated by the incorporation of a film cooling of the upper surface of the ceramic blade portion.

FIG. 1 illustrates a typical prior art ceramic airseal cooling device for a turbine blade portion. The upper surface 11 is the hottest portion of the ceramic body 1 and is cooled by the impingement of air illustrated by arrows 5 at the lower surface of the support substrate of the ceramic body. The cooling air flows through air ducts 7 and 9 to cool the lower surface 13 of ceramic body 1. Since the ceramic layer has a low thermal conductivity, this cooling technique produces a very hot ceramic upper surface 11 and a relatively cold lower inner surface, resulting in a high thermal gradient across the ceramic layer, to induce a high thermal stress tending to weaken the blade.

The teaching of passing cooling air through parallel conduits embedded in turbine blade portions is old in the art. The cooling air passes through, for example, honeycombed passages in U.S. Pat. No. 3,172,621 to Erwin, and forms a cooling air film upon the surface of the airfoil containing the cooling air honeycombed passages. U.S. Pat. No. 4,384,823 to Graham et al, incorporated by reference herein, illustrates the concept of providing an array of cooling air tubes which transmit air to surfaces of a turbine blade. Other U.S. Pat. Nos. such as 4,684,322 and 4,249,291, illustrate the teaching of embedding cooling tubes within the body of turbine blade portions to cool surfaces thereof. It is the principal object of the present invention to provide a method of producing an array of cooling air passages embedded within a ceramic blade portion to be cooled which is believed to be more suitable than the approaches of the prior art.

SUMMARY OF THE INVENTION

In accordance with this invention, a metallic substrate supporting an array of skewed hollow projection members is provided, which convey cooling air to the upper hot ceramic blade surface to form a cooling film upon the finished blade when in use. The projection members also provide a large bonding surface for the ceramic body or blade portion, and conduct heat away from the hot upper portions of the ceramic blade. A novel method of producing this apparatus involves spraying ceramic over the projection members, thereafter machining away upper portions of the projection members to expose hollow cooling air conduits therein, which are thereafter etched away to recess terminal cooling air conduit portions of the projection members within the ceramic body. This avoids exposing the cooling air conduits to the hot gas stream flowing over the upper blade portion, and additionally tends to reduce the possibility of the plugging of the film cooling conduits in the projection members by the ceramic material during engine operation.

For a better understanding of the present invention, together with other and further objects thereof, reference is made to the following description taken in conjunction with the accompanying drawings.

DETAILED DESCRIPTION OF THE DRAWINGS

DETAILED DESCRIPTION OF THE INVENTION

Figure 1:
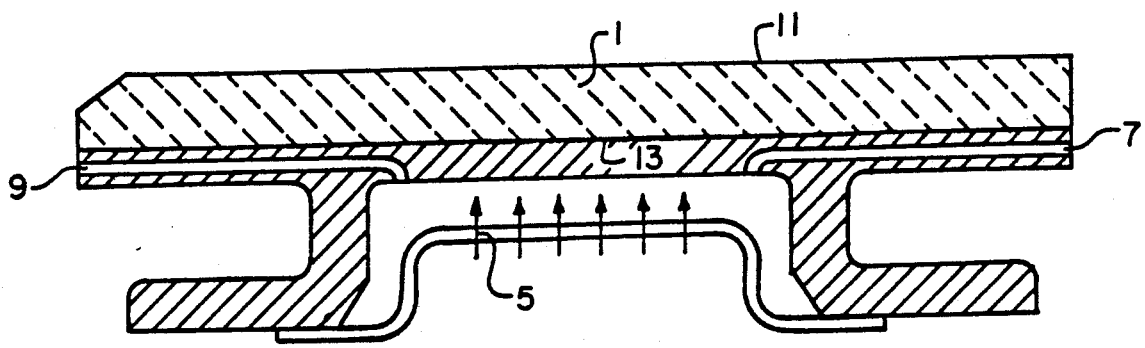
FIG. 1 illustrates a prior art method of cooling of the ceramic blade component.
Figure 2A:
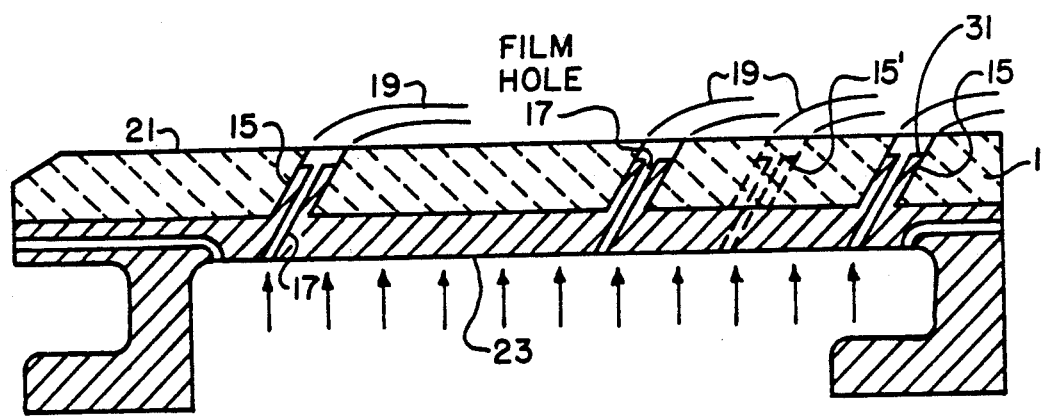
FIGS. 2a and 2b illustrates a sectional front, and side view of a preferred product made by the aforesaid method of the invention.
Figure 2B:
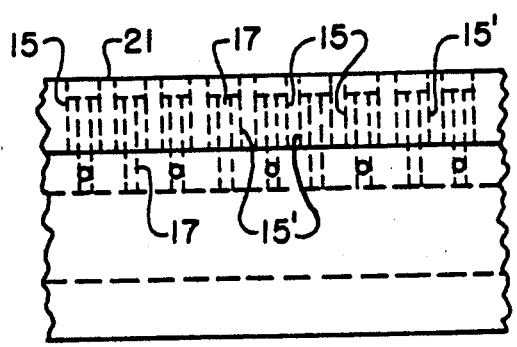

FIG. 2 illustrates the preferred novel blade made by the method of the invention, which includes ceramic layer 1, bonded to substrate 23 and to tubular projections 15. The upper surface 21 is exposed to the hot gases and is cooled by cooling air passing through film hole or cooling air conduit passages 17 within projection members 15. The result is a film of cooling air 19 formed at the upper surface 21.

Figure 3:
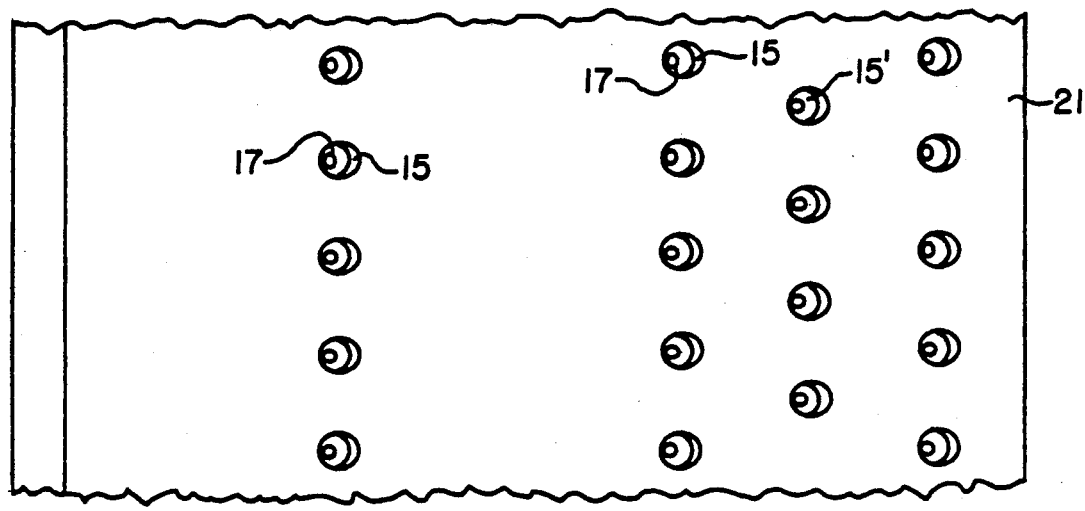
FIG. 3 illustrates a plan view of FIG. 2.
Figure 4:
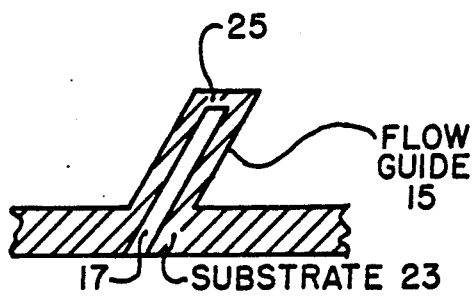
FIGS. 4–7 illustrate various steps in producing the blade.
Figure 5:
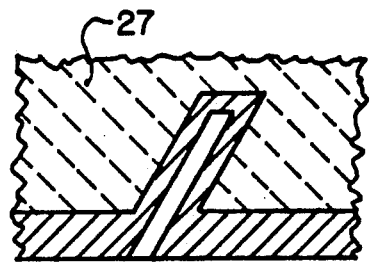
Figure 6:
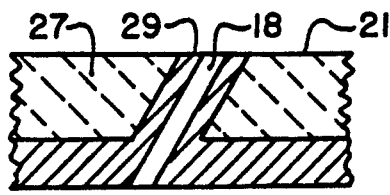
Figure 7:
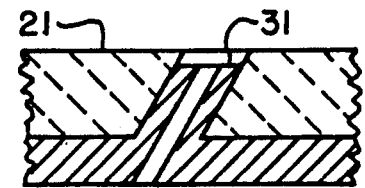

The plan view of FIG. 3 illustrates the array of projection members 15 and the cooling air conduit passages 17. It may be noted that staggered rows are provided at 15' to form an XY array of the film cooling air supply projection members embedded within the ceramic body 21. Thus upper portions of ceramic body at 21 are cooled by the cooling boundary layer of air 19 and are also cooled to a degree by the conduction of heat through the skewed projection members toward the lower cool substrate portion 23.

Referring now to FIGS. 4, 5, 6, and 7, an XY array of projection members 15, affixed to or formed as an integral part of substrate 23, is sprayed with ceramic material so that the tops of the projection members 25 are covered with a body of ceramic material 27. An entire array of numerous projection members 15 and 15' may be formed by molding a single part consisting of the projection members and substrate 23, staggered as illustrated in FIGS. 2 and 3. The top portions of the projection members and of ceramic body 27 are thereafter machined by, for example, grinding, until the solid terminal portions 25 of the projectors 15 are ground away to expose the hollow tubular air passageways through the projection members indicated at 18; see FIG. 6. The metallic upper portions 29 of the projectors are thereafter etched away somewhat, to form recessed terminal portions illustrated at 31 in FIG. 7, resulting in the product of FIG. 2, described above. This feature avoids exposing the conduits to the hot gaseous stream, and reduces the likelihood of the plugging of the air passageways by the ceramic material during engine operation.

Since numerous variations may be made in the practice of the invention, the scope of the invention is to be defined only by the language of the following claims and art recognized equivalents thereof.

What is claimed is;

1. Apparatus for cooling a ceramic turbine blade portion having a low thermal conductivity comprising an array of hollow metallic tubular cooling air conduit projection members having first terminal portions affixed to a conduit support substrate, and having second terminal portions thereof opposite said first terminal portions, said array of cooling air conduit projection members being embedded within said ceramic turbine blade portion for cooling said ceramic blade portion by conduction of heat therethrough, and said second terminal portions being recessed with respect to a surface of said blade portion to be cooled for reducing exposure of the second terminal portions to hot gas streams contacting said blade portion, thereby to enhance heat transfer and also to reduce the possibility of plugging said projection members.

2. The apparatus of claim 1 wherein said cooling air conduit projection members are skewed with respect to said substrate.

3. The apparatus of claim 1 wherein said cooling air conduit projection members are substantially parallel to each other.

4. The apparatus of claim 3 wherein said cooling air conduit projection members are skewed with respect to said substrate.

5. The apparatus of claim 1 wherein said cooling air conduit projection members form an XY array of staggered rows of cooling air conduit members.

6. The apparatus of claim 2 wherein said cooling air conduit projection members form an XY array of staggered rows of cooling air conduit members.

7. The apparatus of claim 3 wherein said cooling air conduit projection members form an XY array of staggered rows of cooling air conduit members.

8. The apparatus of claim 4 wherein said cooling air conduit projection members form an XY array of staggered rows of cooling air conduit members.

* * * * *